US006936205B2

(12) United States Patent
Cavallaro et al.

(10) Patent No.: US 6,936,205 B2
(45) Date of Patent: Aug. 30, 2005

(54) METHOD OF MAKING GOLF BALLS

(75) Inventors: Christopher Cavallaro, Lakeville, MA (US); Matthew F. Hogge, Mattapoisett, MA (US); Mitch E. Lutz, Fairhaven, MA (US); Thomas L. Mydlack, Rochester, MA (US); Jeffrey L. Dalton, North Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 424 days.

(21) Appl. No.: 09/986,928

(22) Filed: Nov. 13, 2001

(65) Prior Publication Data

US 2002/0061790 A1 May 23, 2002

Related U.S. Application Data

(63) Continuation-in-part of application No. 09/717,136, filed on Nov. 22, 2000, now abandoned.

(51) Int. Cl.[7] .............................................. B29C 39/10
(52) U.S. Cl. .................... 264/229; 264/275; 264/279.1; 264/348
(58) Field of Search ............................... 264/348, 229, 264/255, 279.1, 237

(56) References Cited

U.S. PATENT DOCUMENTS

| 4,647,274 | A | * | 3/1987 | Oda ........................... 425/135 |
|---|---|---|---|---|
| 5,006,297 | A | * | 4/1991 | Brown et al. ................ 264/234 |
| 5,733,428 | A | | 3/1998 | Calabria et al. ............. 264/134 |
| 5,888,437 | A | | 3/1999 | Calabria et al. ............. 264/135 |
| 5,897,884 | A | | 4/1999 | Calabria et al. ............. 425/116 |
| 5,947,843 | A | | 9/1999 | Calabria et al. ............. 473/377 |
| 5,952,415 | A | * | 9/1999 | Hwang ........................ 524/399 |
| 6,042,768 | A | | 3/2000 | Calabria et al. ............. 264/135 |
| 6,117,024 | A | | 9/2000 | Dewanjee .................... 473/351 |

FOREIGN PATENT DOCUMENTS

WO    WO 00/62871    10/2000

\* cited by examiner

Primary Examiner—Edmund H. Lee
(74) Attorney, Agent, or Firm—Swidler Berlin LLP (57) ABSTRACT

The present invention is directed to a method of making a golf ball including the steps of cooling a golf ball subassembly such that the golf ball subassembly undergoes a volumetric reduction, and applying a cover layer over the volumetrically reduced golf ball subassembly. The method can further include a three-step curing process after applying the cover layer. The three-steps include maintaining mold halves containing the covered subassembly at a first temperature, heating the mold halves to a second temperature, then maintaining the mold halves at a third temperature. Also, the method can include cooling the cover materials in a mixer so that higher levels of catalyst can be used.

19 Claims, 9 Drawing Sheets

Fig. 12

METHOD OF MAKING GOLF BALLS

CROSS-REFERENCE TO RELATED APPLICATIONS

This application is a continuation-in-part of application Ser. No. 09/717,136 filed on Nov. 22, 2000, now abandoned, which is incorporated by reference herein in its entirety.

TECHNICAL FIELD OF THE INVENTION

The present invention generally relates to golf balls, and more particularly, to a method of making golf balls.

BACKGROUND OF THE INVENTION

Solid golf balls are usually two or more piece constructions. Two-piece golf balls include a single-piece core and a cover. The core forms a golf ball subassembly that the cover surrounds. Three-piece golf balls include a core, an intermediate layer, and a cover. In such balls, the core and intermediate layer form the golf ball subassembly that the cover surrounds.

For a preferred cover the material is a thermosetting polyurethane. One method of making polyurethane-covered golf balls includes disposing the golf ball subassembly into a cover mold and casting the cover thereon. During casting, heat is generated by an exothermic reaction of the thermoset processes. As a result of this heat, the ball subassembly tends to undergo volumetric thermal expansion. The thermal expansion of the subassembly can force the cover mold open and cause the subassembly to shift in the mold so that the cover is uneven and has excessive flash. This can result in an unplayable ball.

Prior solid golf balls having cast urethane covers were made using a method that includes preheating the golf ball subassembly to a predetermined elevated temperature. Preheating the subassembly is done to the extent which causes the subassembly to undergo volumetric thermal expansion. Thereafter, the cover is cast onto the subassembly. Preheating decreases the total temperature change the subassembly is exposed to and minimizes the thermal expansion of the subassembly in the cover mold.

There are several drawbacks to this method. First, it requires that the tooling be sized to accommodate expansion due to preheating rather than for the actual subassembly size. This method also requires that the subassembly expands beyond its ambient dimensions. This method also requires that the subassembly go through large extremes of temperature from pre-heating to cooling. In this process, the subassembly is very sensitive to temperature and any differences in temperature can effect the cover properties. Consequently, the golf ball product can vary in size undesirably when it encounters different temperatures.

Similar problems may arise with materials other than thermoset polyurethane using processes other than casting. It is desirable to provide a method of making a golf ball that overcomes these limitations and produces the improved, playable golf balls of the present invention.

SUMMARY OF THE INVENTION

The present invention is directed to a method of making a golf ball comprising the steps of cooling a golf ball subassembly such that the golf ball subassembly undergoes a volumetric reduction, and applying a cover layer over the volumetrically reduced golf ball subassembly to form a golf ball.

In one embodiment, the golf ball subassembly includes a core, and in another embodiment the subassembly includes a core and at least one intermediate layer.

In another embodiment, the step of applying the cover layer further includes the steps of providing a first mold half and a second mold half with cavities therein, heating the mold halves to a predetermined temperature, adding a cover material to the first mold half cavity, allowing the cover material to gel, inserting the golf ball subassembly into the first mold half cavity, adding the cover material to the second mold half cavity, and mating the second mold half with the first mold half so that the cover material and the golf ball subassembly are contained within the cavities in the mold halves. In this embodiment, the method can further include curing the cover material after the step of mating the second mold half.

The step of curing the cover material preferably includes the steps of maintaining the mold halves at a first temperature for a first predetermined time, heating the mold halves to a second temperature greater than the first temperature for a second predetermined time, and maintaining the mold halves at a third temperature for a third predetermined time. More preferably, the first step includes bringing the mold halves to the first temperature between about 70° F. and about 110° F. The second step includes heating the mold halves to the second temperature greater than about 120° F. The third step includes maintaining the mold halves at the third temperature of between about 70° F. and about 110° F. In one embodiment, a cooling step may be required after cooling the cover.

Alternatively, the present invention is directed to a method of curing a golf ball cover as described above.

In yet another embodiment of the present invention, the prepolymer and curing agent are mixed in a fluid cooled chamber to control the gelling rate thereof. More preferably, the mixing chamber is cooled using a liquid such as water at less than 70° F. In a most preferred embodiment, water cooled to 50° F. to 60° F. is used to maintain the material in the mixing chamber at temperature below about 130° F. Preferably, the material is comprised of greater than about 0.1% catalyst.

DETAILED DESCRIPTION OF THE PREFERRED EMBODIMENTS

Figure 1:
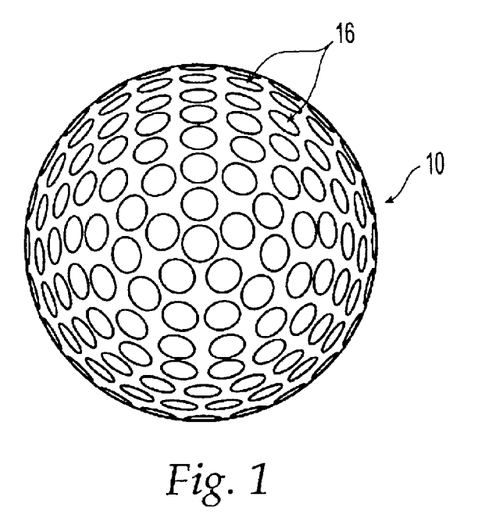
FIG. 1 is a perspective view of a golf ball formed according to a method of the present invention.
Figure 2:
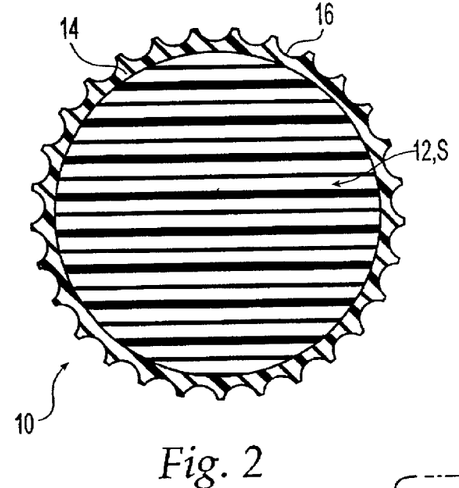
FIG. 2 is a cross-sectional view of the golf ball of FIG. 1.

Referring to FIGS. 1 and 2, a method of the present invention can be used to make a golf ball 10 which comprises a core 12 surrounded by at least one cover layer 14. The cover layer 14 forms the outer surface of the ball 10 and defines dimples 16 therein. In the golf ball 10, the core 12 is the golf ball subassembly S and is of a molded, solid construction.

Figure 3:
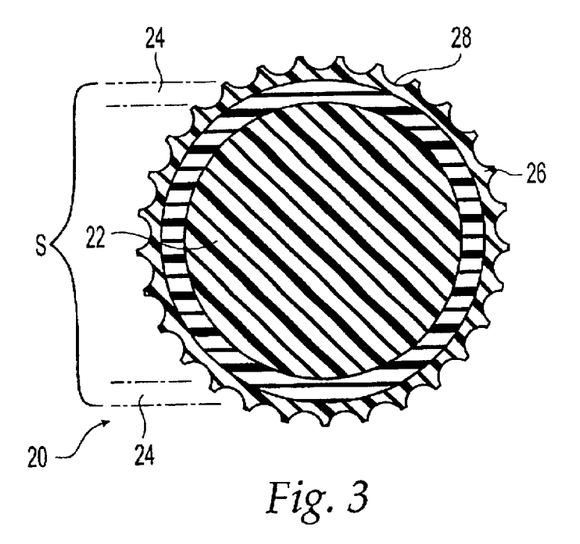
FIG. 3 is a cross-sectional view of another embodiment of a golf ball formed using the method of the present invention.

Referring to FIG. 3, the method of the present invention can be used to make a golf ball 20 that includes a core 22 surrounded by at least one intermediate layer 24, which is surrounded by a cover 26. The core 22 and the intermediate layer 24 form the golf ball subassembly S. The cover 26 includes dimples 28.

Although the golf balls 10 and 20 are shown with solid cores 12 and 22, respectively, the present invention can also be used with fluid-filled cores or wound cores. The fluid within the core can be a wide variety of materials including air, water solutions, liquids, gels, foams, hot-melts, other fluid materials and combinations thereof, as known by those of ordinary skill in the art.

Referring to FIG. 3, the intermediate layer 24 can be formed by molding conventional core, mantle layer or cover layer materials on the core 22. The molding techniques used to form the intermediate layer can be those such as injection molding or compression molding. In an alternative embodiment, the ball 20 can be formed with any number of intermediate, core or cover layers formed in any manner. These layers can be solid or wound.

Referring again to FIGS. 2 and 3, the covers 14 and 26 should be tough, cut-resistant, and selected from conventional materials used as golf ball covers based on the desired performance characteristics. The cover may include one or more layers. Cover materials can be injection moldable, such as ionomer resins, blends of ionomer resins, polyurethane ionomer, thermoplastic urethane, and polyisoprene and blends thereof, as known in the art. However, in the preferred embodiment, the cover is formed of a thermoset polyurethane, such as a castable polyurethane or a thermoset material that is reaction injection moldable.

Figure 4:
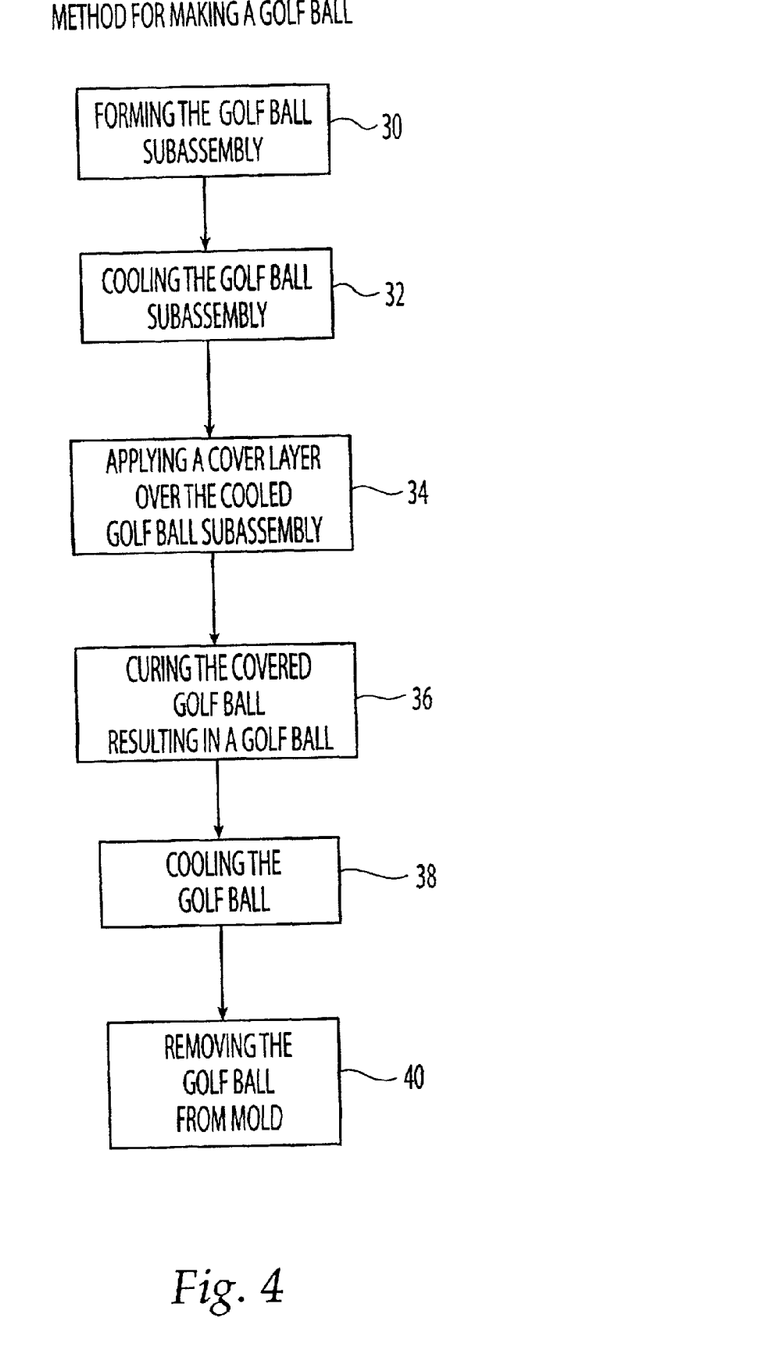
FIG. 4 is a flow chart showing the method of making the golf ball according to the present invention.

Referring to FIG. 4, the method of making golf balls 10 and 20 (as shown in FIGS. 2 and 3) according to the present invention generally includes steps 30–40 and will now be discussed. Step 30 includes forming the golf ball subassembly, which includes forming the core 12 (as shown in FIG. 2) or forming the core 22 and the intermediate layer 24 (as shown in FIG. 3), depending on the construction of the golf ball subassembly.

In more detail, the cores 12 and 22 can be formed by conventional techniques such as disclosed in U.S. Pat. No. 4,389,365 to Kudriavetz, which is incorporated herein by reference in its entirety. Preferably, the cores are formed of compositions having a rubber base material, an initiator, crosslinking agents, a filler and a co-crosslinking agent. The rubber base material is typically a synthetic rubber like 1,4-polybutadiene having a cis-structure of at least 40%. Natural rubber, polyisoprene rubber and/or styrene-butadiene rubber may optionally be added to the 1,4-polybutadiene. The initiator included in the core composition can be any polymerization initiator which decomposes during the cure cycle. The crosslinking agents includes a metal salt of an unsaturated fatty acid such as sodium, zinc, lithium or magnesium salt or an unsaturated fatty acid having 3 to 8 carbon atoms such as acrylic or methacrylic acid. Preferably, zinc diacrylate and peroxide are used in these cores. The filler typically includes materials such as zinc oxide, barium sulfate, silica, calcium carbonate, zinc carbonate, regrind, or any powdered metal such as tungsten, and the like.

Other ingredients such as accelerators, e.g. tetra methylthiuram, processing aids, processing oils, plasticizers, dyes and pigments, as well as other additives well known to one of ordinary skill in the art may also be used in the present invention in amounts sufficient to achieve the purpose for which they are typically used.

Generally, all of the ingredients except the initiator are combined. When a set of predetermined conditions is met, i.e., time and temperature of mixing, the initiator is added to the other ingredients in an amount dependent upon the amounts and relative ratios of the starting components, as would be well understood by one of ordinary skill in the art.

After completion of the mixing, the golf ball core composition is milled and hand prepped or extruded into pieces ("preps") suitable for molding. The milled preps are then compression molded into cores at an elevated temperature. Typically, about 335° F. for about 15 minutes is suitable for this purpose.

Other suitable materials for the cores include thermosets, such as rubber, polyisoprene; thermoplastics such as ionomer resins, polyamides or polyesters; or a thermoplastic elastomer. Suitable thermoplastic elastomers include but are not limited to Pebax®, Hytrel®, thermoplastic urethane, and Kraton®, which are commercially available from Elf-Atochem, DuPont, various manufacturers, and Shell, respectively. Blends of these thermoplastic elastomers can also be used. The core material can also be formed from a castable or reaction injection moldable material. Suitable castable materials include, but are not limited to urethane, polyurea, epoxy, and silicone. The core can also be fluid-filled center with or without windings or solid-center wound core.

The intermediate layer, if desired, can be formed by joining two hemispherical cups of material in a compression mold or by injection molding, as known by one of ordinary skill in the art. The intermediate layer may be a thermoplastic or a thermoset material. For example, a recommended ionomer resin material is SURLYN® and a recommended thermoplastic copolyetherester is Hytrel®, which are commercially available from DuPont. Blends of these materials can also be used. Another example of a suitable intermediate layer material is a thermoplastic elastomer, such as described in U.S. Pat. Nos. 6,315,680 and 5,688,191, which are both incorporated herein by reference in their entireties.

Referring again to FIG. 4, after forming the subassembly in step 30, step 32 includes cooling the golf ball subassembly so that the golf ball subassembly undergoes a volumetric reduction. Preferably, the subassembly volume after the volumetric reduction is at least about 1% of the golf ball subassembly initial volume. In another embodiment, the subassembly is heated to undergo a volume increase.

This cooling step 32 preferably includes disposing the subassembly in a cooling chamber. A recommended cooling chamber would be a commercially available freezer or refrigeration unit capable of achieving the necessary temperatures. Preferably, cooling also includes decreasing the temperature of the golf ball subassembly to a maximum cooling temperature of less than about 75° F. More preferably, the maximum cooling temperature is less than about 50° F. More preferably still, the maximum cooling temperature is between about −10° F. and about 40° F. Most preferably, the maximum cooling temperature is 20° F. In one embodiment, the maximum cooling temperature can be maintained at room temperature or about 72° F.

It is recommended that in the cooling step that the golf ball subassembly is maintained at the maximum cooling temperature for greater than 20 minutes. More preferably, the golf ball subassembly is maintained at the maximum cooling temperature for greater than 1 hour. This cooling step occurs before the step of applying the cover layer.

With reference to FIG. 4 after cooling step 32, step 34 includes applying a cover layer, such as covers 14 and 26 (shown in FIGS. 2 and 3) over the volumetrically reduced or cooled golf ball subassembly. In the preferred embodiment, the cover is cast or reaction injection molded over the subassembly.

Prior to forming the cover layer, the subassembly may be surface treated to increase the adhesion between the outer surface of the subassembly and the cover. Examples of such surface treatment may include mechanically or chemically abrading the outer surface of the subassembly. Additionally, the subassembly may be subjected to corona discharge or plasma treatment prior to forming the cover around it. Other layers of the ball also may be surface treated. Examples of these and other surface treatment techniques can be found in U.S. Pat. No. 6,315,915, which is incorporated by-reference in its entirety.

Figure 5:
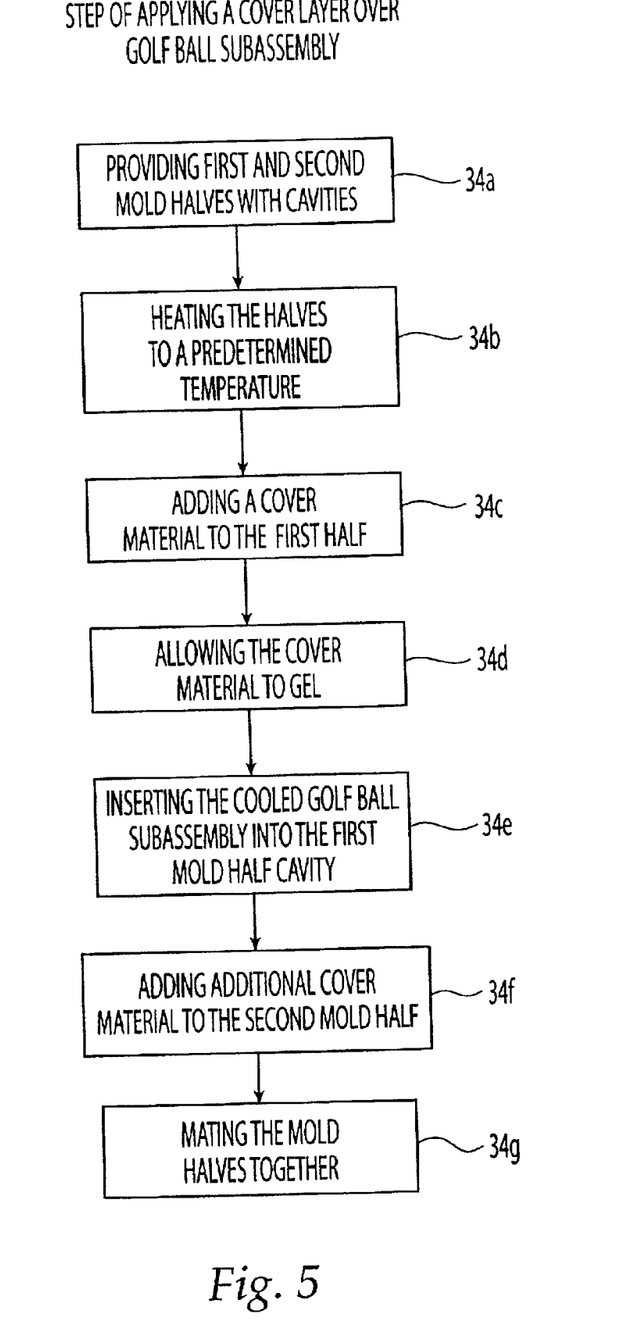
FIG. 5 is a flow chart showing the details for a step of applying a layer over a golf ball subassembly in the method shown in FIG. 4.

Referring to FIGS. 4 and 5, when the layer is a cast material the step 34 of applying the cover layer preferably further includes steps 34a–34g. Step 34a includes providing a first mold half and a second mold half, as discussed in detail below with respect to the equipment used for these steps. The first and second mold halves have cavities therein. Step 34b includes heating or pre-heating the mold halves to a predetermined temperature of between about 100° F. and about 150° F. More preferably, the molds are pre-heated to 110° F. Step 34c includes adding a polyurethane cover material to the first mold half cavity. Step 34d includes allowing the cover material to gel. Step 34e includes inserting the cooled golf ball subassembly from step 32 into the first mold half cavity. Step 34f includes adding additional cover material to the second mold half cavity. Step 34g includes mating the second mold half with the first mold half so that the cover material and the golf ball subassembly are contained within the cavities in the mold halves to form a covered golf ball.

Figure 6:
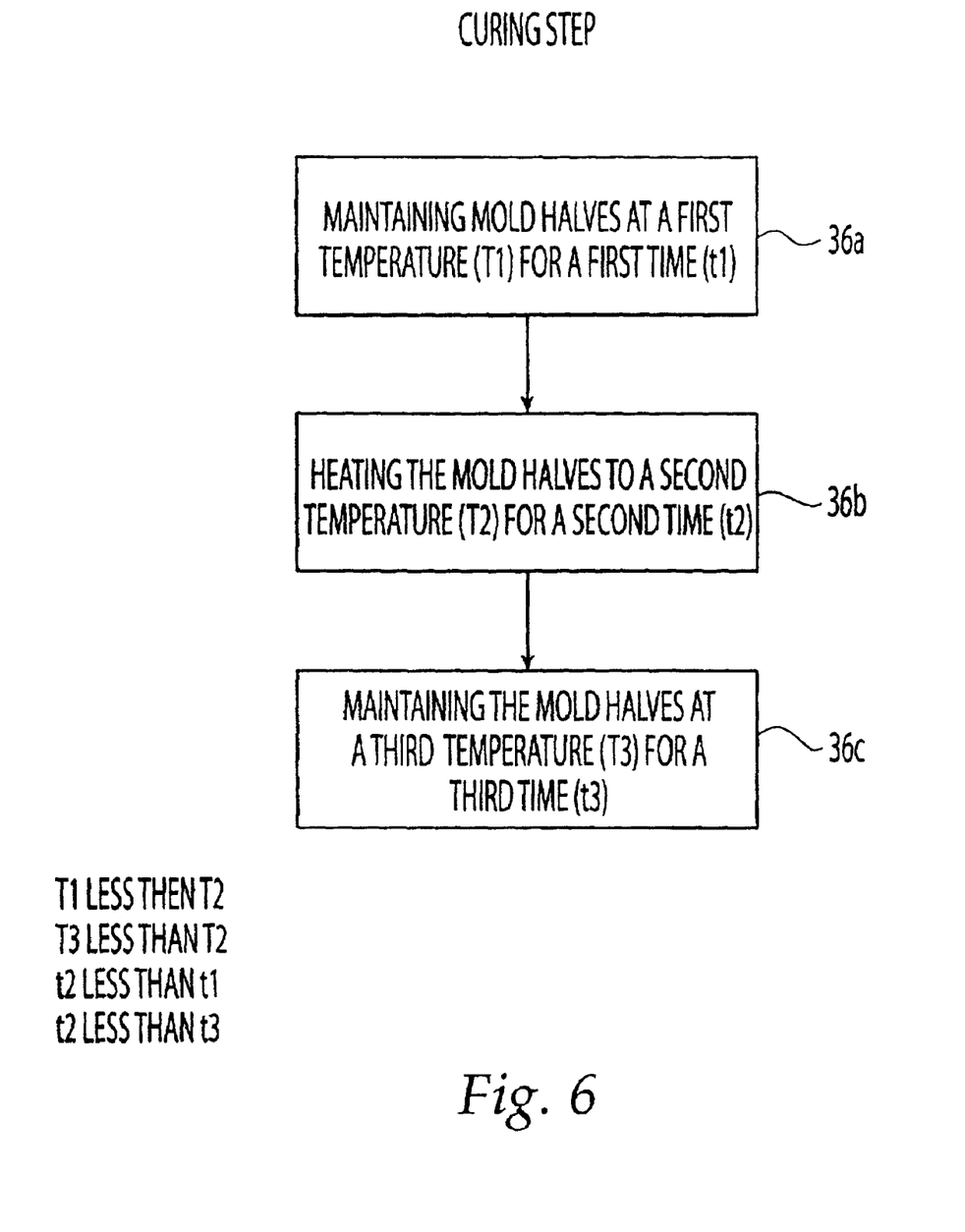
FIG. 6 is a flow chart showing the details for a step of curing a covered golf ball subassembly in the method shown in FIG. 4.

Referring again to FIG. 4 after the cover layer is applied in step 34, the covered golf ball is cured in step 36. Referring to FIG. 6, the step 36 of curing the covered golf ball subassembly and more particularly curing the cover layer 14 or 26 (shown in FIGS. 2 and 3) includes steps 36a–36c. The first curing step 36a includes maintaining the mold halves at a first temperature (T1) for a first predetermined time (t1). The second curing step 36b includes heating the mold halves to a second temperature (T2) greater than the first temperature (T1) for a second predetermined time (t2). The third curing step 36c includes maintaining the mold halves at a third temperature (T3) for a third predetermined time (t3). It is recommended that the second predetermined time t2 is less than the first predetermined time (t1) and the third predetermined time (t3).

It is recommended that the first temperature is sufficient to allow the cover material to become plastic (i.e., not flowing). More specifically, it is recommended that the first temperature is sufficient to allow the cover material to "initially cure." For this specification and the attached claims the term "initially cure" means that the cover material has a low green strength.

Preferably, the first temperature is between about 70° F. and about 110° F. The preferred first predetermined time is between about 2 minutes and about 20 minutes. Most preferably, the first temperature is between about 70° F. and about 90° F. and the first predetermined time is between about 5 minutes and about 10 minutes.

It is recommended that the second temperature is sufficient to substantially cure the cover material without significantly heating the golf ball subassembly, which is interior to the cover. Preferably, the second temperature is greater than about 120° F., and more preferably between about 130° F. and about 200° F. The preferred second predetermined time is between about 2 minutes and about 10 minutes. Most preferably, the second temperature is between about 130° F. and about 140° F. and the second predetermined time is about 5 minutes.

It is recommended that the third temperature is less than the second temperature. Preferably, the third temperature is between about 70° F. and about 110° F. The preferred third predetermined time is between about 5 minutes and about 20 minutes. Most preferably, the third temperature is between about 70° F. and about 90° F. and the third predetermined time is between about 10 minutes and about 15 minutes.

Turning again to FIG. 4, after the step 36 of curing the covered golf ball subassembly, the resulting golf ball is cooled in step 38 and then removed from the mold in step 40. The step 38, however, is optional. Whether the ball is cooled after curing depends on the third temperature. In the step 38 of cooling the golf ball, it is recommended that the golf ball is cooled sufficiently to allow it to be removed easily from the mold without any cover material sticking to the mold. Preferably, during the cooling in step 38 the golf ball is cooled to a fourth temperature lower than the first curing temperature (T1). More preferably, the fourth temperature is between about 50° F. and about 70° F., and most preferably about 70° F. This temperature is maintained for a fourth predetermined time from about 5 to about 15 minutes and more preferably for about 10 minutes. This cooling step can be done using a cooling chamber or freezer or by allowing the ball to cool in a room temperature environment. After this the ball is removed in step 40, the method steps 30–40 can be repeated to make additional golf balls.

Figure 7:
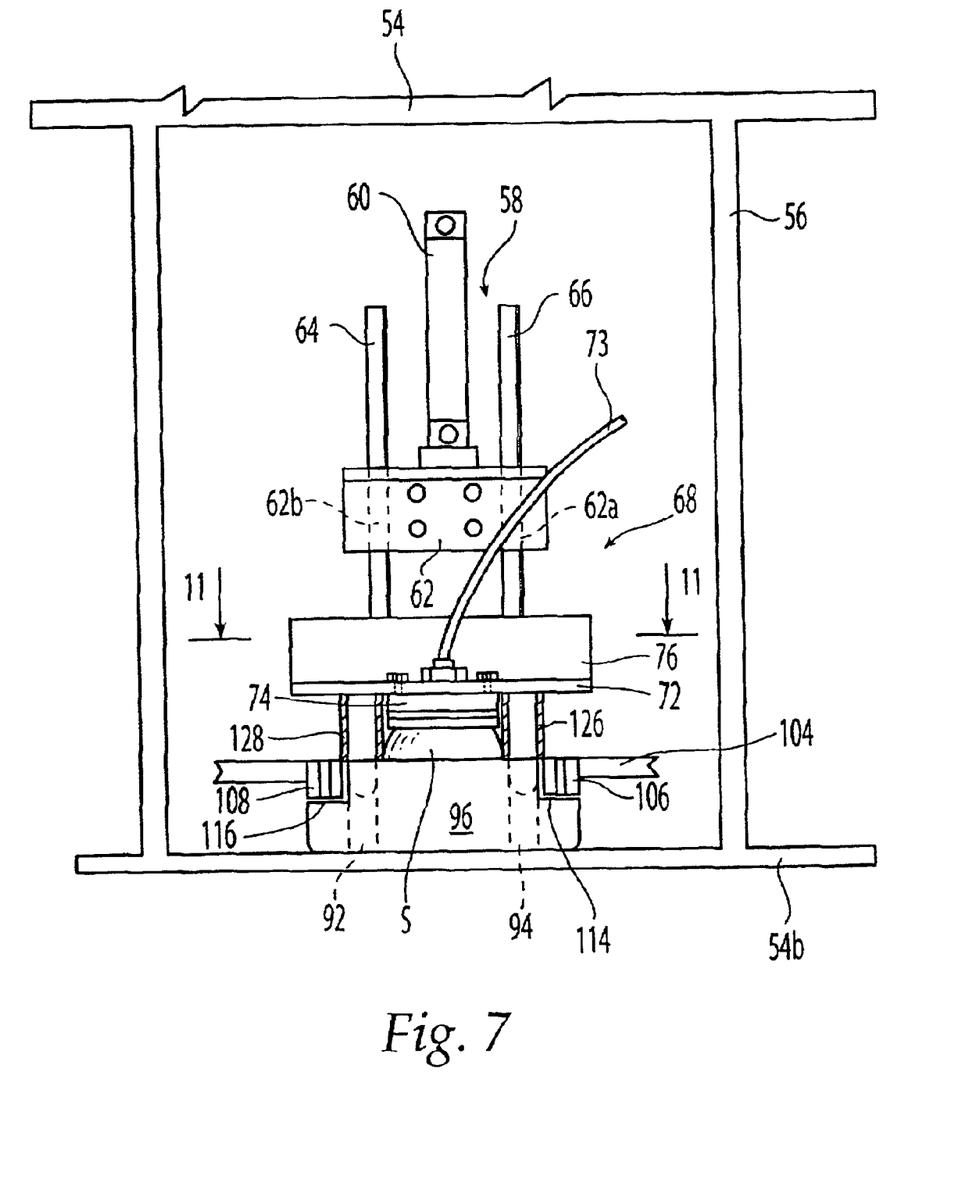
FIG. 7 is a front, elevational view of a preferred embodiment of a golf ball subassembly alignment device used when covering the subassembly.

Now, the apparatus used during the step 34 (as shown in FIG. 4) of applying the layer will be discussed. Referring to FIG. 7 in order to form the cover, a centering fixture unit 54 is used. The fixture unit 54 includes box frame 56, stationary central guide mount 58 comprising fixed cylinder 60 and stationary guide block 62. Guide block 62 has two (2) parallel passageways 62a, 62b there through for receiving movable rods 64, 66 in sliding vertical movement.

Figure 8:
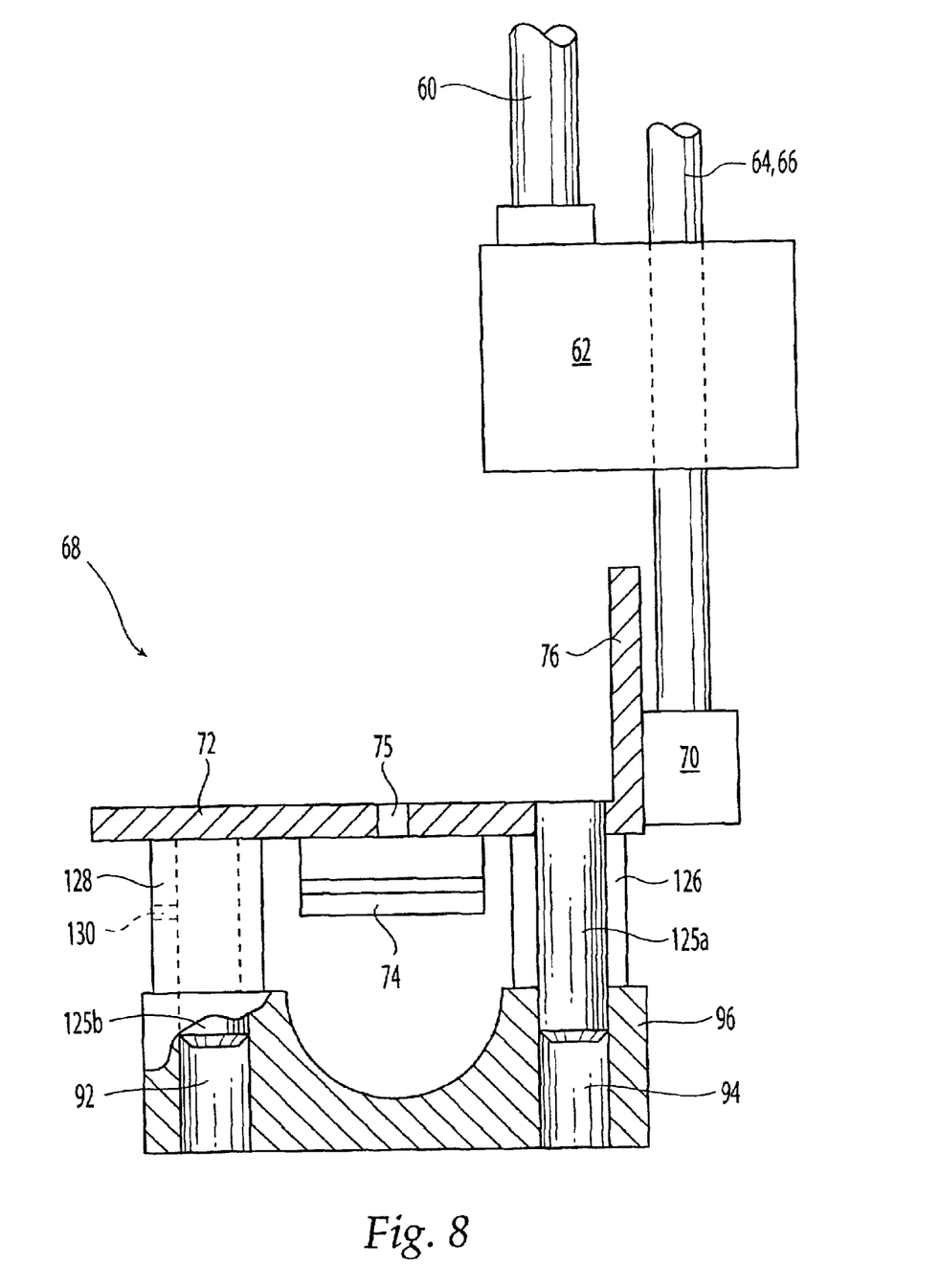
FIG. 8 is a side elevational view of the alignment device of FIG. 7.

Referring to FIG. 8, rods 64, 66 are fixed to slide ball cup frame unit 68 through back piece 70. Frame unit 68 includes base plate 72 with a ball cup 74 mounted thereto, central opening 75, and upstanding back plate 76. As shown in FIG. 7, ball cup 74 holds ball subassembly S through reduced pressure (or partial vacuum) in hose 73. As best seen in FIG. 8, back piece 70 is secured to back plate 76.

Figure 10:
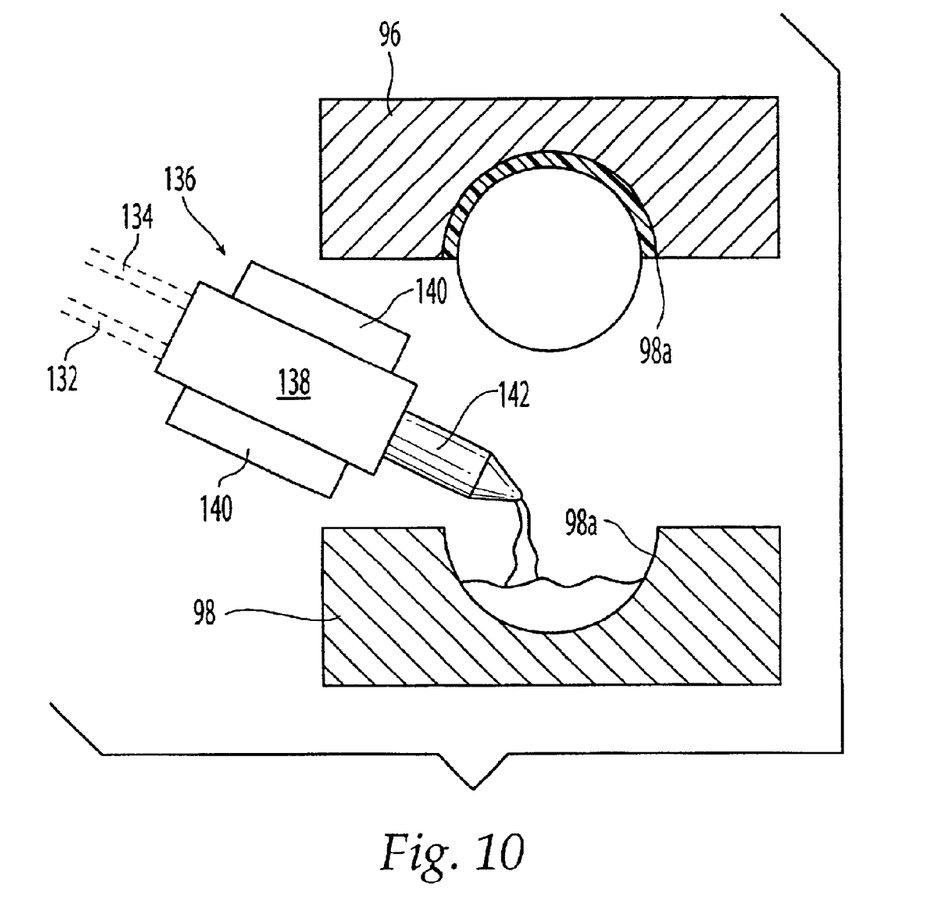
FIG. 10 is a partial, cross-sectional view of an apparatus for mixing a cover material, wherein the apparatus is dispensing the cover material in a lower mold half and an upper mold half is inverted before mating it with the lower mold half.
Figure 11:
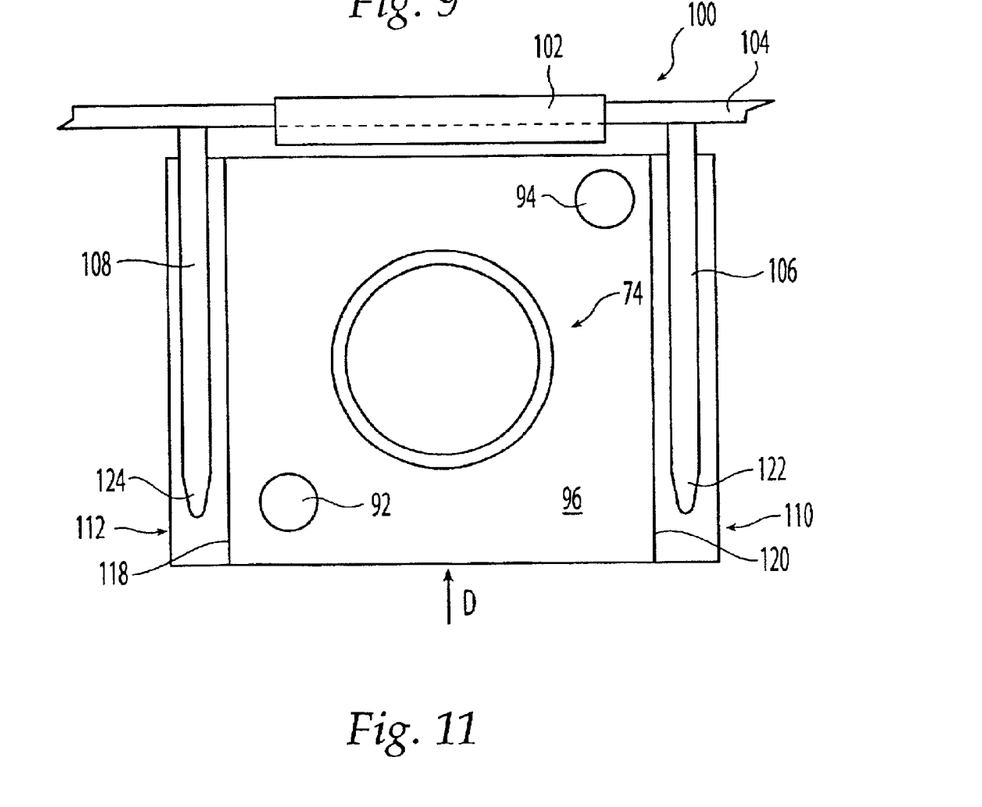
FIG. 11 is a cross-sectional view along line 11—11 of FIG. 7 showing a mold being positioned in the alignment device of FIG. 7.

Each mold half 96, 98 (as shown in FIG. 10) is aligned with respect to the fixture frame base 54b of frame 54 using a horizontal rail alignment unit 100 which includes stationary mount block 102 (as shown in FIG. 11) positioned on fixture base 54b, a raised horizontal cross piece 104 which carries two (2) parallel alignment rails 106, 108 having square cross sections. Rails 106,108 lie in mold end-to-end indentations 110, 112. Each mold indentation 110 and 112 includes a horizontal wall 114, 116 (as seen in FIG. 7) and a vertical wall 118, 120. Rails 106, 108 have tapered tips 122, 124 to assist in guiding and positioning mold halves 96, as each is slid in direction D to the position of FIG. 11. As a mold half 96 is moved back against block 102, it is aligned and the mold half 96 is thereafter accurately positioned as pins 125a and 125b (as shown in FIG. 9) engage and move, as necessary, during fixture descent. The spacings between block 102 and rails 106, 108 and mold 96 are exaggerated in FIG. 11. These tolerances are small enough to achieve the necessary centering tolerances.

Vertical position of subassembly S in ball cup 74 is accomplished using machined collars 126, 128 which slip over pins 125a, 125b as shown in FIG. 8. Set screws 130 are used to hold collars 126, 128. The length of collars 126, 128 determines the distance between cup plate 72 and mold halves 96, 98 and thereafter the position of subassembly S in cup 74.

Figure 9:
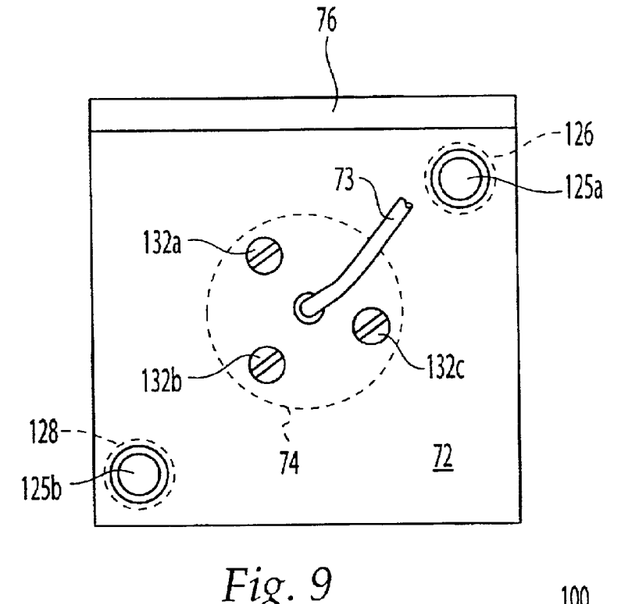
FIG. 9 is a top view of a portion of the alignment device of FIG. 7.

As shown in FIG. 9, cup 74 (shown in phantom) is not adjustable in this embodiment but is held in fixed relationship to plate 72 with fasteners 132a–c. In another embodiment, the cup 74 can be adjustable with respect to plate 72 by defining elongated slots in the plate in which screws can move to change the position of the cup 74.

Although the apparatus in FIG. 7 is shown to hold one mold half, the apparatus can be configured to hold a number of mold halves simultaneously.

The cover material used in the present method is polyurethane which is the product of a reaction between a polyurethane prepolymer and a curing agent. The polyurethane prepolymer is a product formed by a reaction between a polyol and a diisocyanate. The curing agent is either a polyamine or glycol. A catalyst may be employed to promote the reaction between the curing agent and the polyurethane prepolymer. Alophatic and Aromatic compositions are preferred, such as those described in copending application Ser. No. 09/955,622, which is incorporated by reference herein in its entirety.

Suitable polyurethane prepolymers for use in the present invention are made from a polyol, such as polyether, polyester or polylactone, and a diisocyanate. Suitable diisocyanates for use in the present invention include 4,4'-diphenylmethane diisocyanate (MDI) and 3,3'-dimethyl-4,4'-biphenylene diisocyanate (TODI), toluene diisocyanate (TDI), and para-phenylene diisocyanate. The present invention is not limited to the materials listed above and others can also be used.

Suitable polyether polyols include polytetramethylene ether glycol; poly(oxypropylene) glycol; and polybutadiene glycol. Suitable polyester polyols include polyethylene adipate glycol; polyethylene propylene adipate glycol; and polybutylene adipate glycol.

Suitable polylactone polyols include diethylene glycol initiated caprolactone; 1,4-butanediol initiated caprolactone; trimethylol propane initiated caprolactone; and neopentyl glycol initiated caprolactone. The preferred polyols are polytetramethylene ether glycol; polyethylene adipate glycol; polybutylene adipate glycol; and diethylene glycol initiated caprolactone.

Suitable curatives for use in the present invention are selected from the slow-reacting polyamine group consisting of 3,5-dimethylthio-2,4-toluenediamine; 3,5-dimethylthio-2,6-toluenediamine; N,N'-dialkyldiamino diphenyl methane; trimethylene-glycol-di-p-aminobenzoate; polytetramethyleneoxide-di-p-aminobenzoate; or a difunctional glycol; and mixtures thereof. 3,5-dimethylthio-2,4-toluenediamine and 3,5-dimethylthio-2,6-toluenediamine are isomers and are sold under the trade name ETHACURE™ 300 by Ethyl Corporation. Trimethylene glycol-di-p-aminobenzoate is sold under the trade name POLACURE 740M and polytetramethyleneoxide-di-p-aminobenzoates are sold under the trade name Polamine by Polaroid Corporation. N,N'-dialkyldiamino diphenyl methane is sold under the trade name UNILINK™ by UOP.

Suitable difunctional glycols are 1,4-butanediol; 1,3-butanediol; 2,3-butanediol; 2,3-dimethyl-2,3-butanediol; dipropylene glycol; and ethylene glycol. Difunctional glycols are inherently slow-reacting.

In a preferred embodiment, to start the cover formation, the prepolymer is preheated and degassed at between about 140° F. and about 160° F. and the curative is also preheated and degassed at a temperature of between about 140° F. and 160° F. In another embodiment, the prepolymer and the curative are maintained at room temperature or less prior to mixing. Preferably, the prepolymer and curative both have approximate viscosities of greater than about 2000 cps. Referring to FIG. 10, metered amounts of prepolymer and curative are fed through lines 132 and 134, respectively. Mixing of the prepolymer and curative is accomplished in motorized mixer 136 including mixing head 138 by feeding through lines 132 and 134 of curative and prepolymer. The mixer 136 is cooled by cooling jacket 140. Nozzle 142 is connected to mixing head 138 for exiting the material.

Due to the exothermic reaction of prepolymer and curative as mixed, the mixing head temperature will tend to rise. To control such a rise, the mixing head temperature is maintained by cooling in a range appropriate for the specific urethane material, reaction rate and catalyst level and to attain a workable gel time.

Because heat can shorten the duration of time the mixture is in liquid form, removal of heat helps assure that the cover layer materials do not begin to gel prematurely during the mixing process. Without adequate heat removal, the act of mixing the materials alone can generate enough heat to gel the material within the mix chamber, rendering the material and potentially its process equipment useless.

Cooling may be performed by running air through cooling jacket 140. The air removes some of the heat generated by mixing the cover layer materials. However, if the cover layer material is a fast reacting urethane formulation air cooling may not remove sufficient heat generated by the mixing process to control the reaction rate and prevent premature gelling of the material during the mixing process.

Thus, in some cases the use of air cooling may limit the types of materials that may be cast around the ball to form a cover and limits green strength development due to slow reactivity. As mentioned above, one such class of materials is fast reacting urethane formulations. The gel times of these mixtures often are too short for the amount of residual heat present with air cooled mixers.

Use of air cooling also affects the curing process. The presence of residual heat remaining after air cooling the mixer affects the molecular structure of the cover layer material, requiring post-cure heat treatment. Air cooling also limits the choice of materials due to high reaction rates at elevated temperatures.

In contrast to using air to cool the mixer, one aspect of the present invention is to use a liquid to cool the mixer. A preferred liquid is water. A more preferred liquid is chilled water having a temperature of less than 70° F. and, more preferably, between about 30° F. and 60° F. Running a liquid through cooling jacket 140 removes more heat than does running air through cooling jacket 140 and the material in the mixer can be maintained at a temperature of less than about 130° F. This allows for more types of materials, including those with a short gel time, to be used. Removing more heat from the mixing process also allows for improved thermal management. This achieves higher green strength at demolding (removing the ball from the mold) and speeds up downstream golf ball processing.

Liquid cooling also may result in a larger processing window during which the materials may be mixed. Thus, new formulations that were previously deemed as not viable are now suitable for use. This is useful with fast reacting, castable thermoset materials. For example, the process works well with fast reacting urethane compositions that possess a high catalyst level, such as greater than 0.1%. In addition, the increased cooling capacity that can be provided by a liquid-cooled mixer may allow light stable urethane, including slow reacting light stable urethane formulations to be used with high catalyst concentrations.

Using a water cooled mixer allows for better thermal management of the material during and after mixing. Curing temperatures can be increased. An elevated post-cure temperature may be used, which enhances the cure process, strengthening the green state of the cast layer. This also facilitates the demolding process.

An exemplary material used with a liquid cooled mixer is a light stable urethane. Inadequate cooling of light stable urethane formulations during mixing can result in insufficient cover integrity. For example, the cover may be tacky upon demolding or exhibit low initial green strength unless there is sufficient catalyst in the formulation and the curing temperature is sufficiently high.

Increasing the catalyst level, however, decreases the gel time at a given temperature. Thus, while an increase in catalyst in the formulation may result in better cover integrity upon completion of the molding process, the increase may also cause the formulation to prematurely gel during mixing. In this situation, liquid-cooling the mixture can help prevent gelling during the mixing process. In one embodiment of the present invention, liquid cooling the mixture allows for the catalyst level of the formulation to be approximately 0.1% or greater. Preferably, the formulation is a light stable urethane.

As mentioned above, elevating the curing temperature helps decrease cover tackiness, which facilitates demolding, and also helps increase green strength. The curing of the material may be in stages of varying temperatures and varying lengths of time. For example, the material may be cured in two stages. Preferably, the first curing stage is at a temperature between about ambient and about 325° F., more preferably from ambient to about 255° F., and may last between about 3 to about 25 minutes, more preferably lasting from about 6 to about 12 minutes. In a preferred embodiment, the first curing temperature is about 255° F. and lasts for about 6 minutes. Other curing temperatures and times may also be used depending on the particular formulation used and properties desired of the cover when the ball is removed from the mold.

Preferably, the second curing temperature is less than the first curing temperature. For instance, the second curing temperature may be at less than about 200° F., or alternatively less than about 130° F., and preferably at about ambient temperature. The duration of the second curing temperature can be any length of time, as is also the case for the first curing stage. In one embodiment, the duration of the second curing stage is less than one hour, while in another the curing time is between about 5 to 30 minutes. Preferably, the second curing stage lasts about 20 minutes.

From the time mixing commences until the reacting material is fed into cavity 96*a* of top mold 96 or cavity 98*a* of bottom mold half 98 is about 4 seconds to about 7 seconds. Referring to FIG. 7, top preheated mold half 96 is filled and placed in fixture unit 54 using pins 125*a*, 125*b* moving into holes 94, 92 (as shown in FIG. 8). After the reacting materials have resided in top mold halves 96 for about 50 seconds to about 80 seconds, subassembly S in cup 74 is lowered at a controlled speed into the gelling reacting mixture by lowering frame unit 68 using a pneumatic powered arrangement not shown. Alternatively, electric or hydraulic systems may be used. Controlled lowering is accomplished by adjustment of the powered arrangement and by use of pneumatic controls not shown to lessen and preferably prevent air bubbles. The collars 126 and 128 limit movement downward of the unit 68. The amount of mixture introduced into mold half cavity 96*a* (as shown in FIG. 10) is about 5.4 grams to about 5.7 grams.

Upon location of the subassembly S in half mold 96, coating and gelling for 50–80 seconds, the vacuum is released in line 73 allowing subassembly S to be released. Mold half 96 with subassembly and gelled or solidified cover half thereon is removed from the centering fixture unit 54, inverted (see FIG. 10) and mated with other mold half 98 which, at an appropriate time earlier have had a selected quantity of reacting polyurethane prepolymer and curing agent introduced therein to commence gelling. The bottom mold half 98 has similar mixture amounts introduced into its cavity 98*a* as in cavity 96*a*. Details with respect to the timing of this process are disclosed in U.S. Pat. No. 6,042,768 to Calabria, et al., which is incorporated herein by reference in its entirety.

After the cover material is applied and the mold halves 96, 98 assembled, the mold halves 96 and 98 are clamped together under between about 400 and about 600 psi pressure. These halves are clamped by bolts or any conventional manner. Excess polyurethane is extruded from the mold cavities 96*a* and 98*a* into sprues 96*b* and 98*b* forming flash on the golf ball cover as discussed below.

Figure 12:
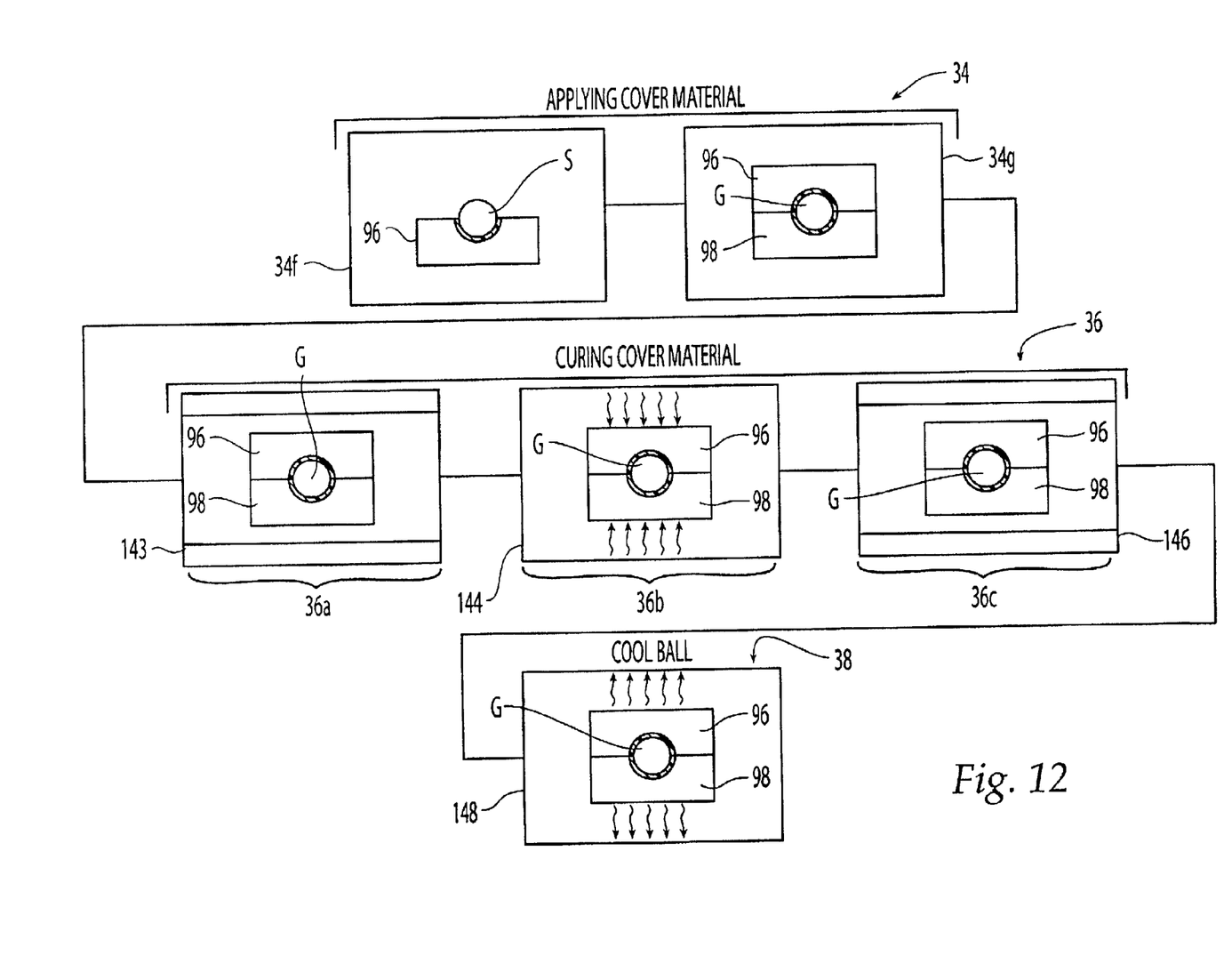
FIG. 12 is a schematic representation showing the steps of the method shown in FIG. 4 of applying the cover material, curing the cover material and cooling the ball.

Referring to FIG. 12, steps 34–38 of applying the cover material, curing the cover material and cooling the ball are schematically represented. Step 34*f* includes inserting the cooled golf ball subassembly S and would use the fixture 54 (as shown in FIG. 7) as described above. Step 34*g* of mating the mold halves 96 and 98 together is the last step in applying the cover material.

The first curing step 36*a* of maintaining the mold halves 96, 98 at a first temperature for a first predetermined time is achieved by placing the mold halves 96, 98 and golf ball G into an insulated chamber 143. This step can also be accomplished by using a cooling chamber. Insulating and cooling chambers are commercially available and capable of maintaining the necessary temperatures.

The second curing step 36*b* of heating the mold halves 96, 98 to a second temperature is achieved by placing the mold halves 96, 98 and the golf ball G into a curing oven 144. Curing ovens are commercially available, and a preferred type would be a convection oven capable of achieving the necessary temperatures.

The third curing step 36*c* of maintaining the mold halves 96, 98 at a third temperature for a third predetermined time is achieved by placing the mold halves 96, 98 and the golf ball G into an insulating chamber 146, similar to chamber 143. This step can also be accomplished by using a cooling chamber. Insulating and cooling chambers are commercially available and capable of maintaining the necessary temperatures. Mold halves 96, 98 are held together for between about 10 minutes and about 15 minutes then cooled.

Referring to FIG. 12, step 38 of cooling the golf ball G is achieved by placing the mold halves 96, 98 and the golf ball G into a cooling chamber 148. Cooling chambers for use in this step are commercially available.

Referring again to FIG. 4, in step 40 the mold halves 96, 98 are opened and the ball is demolded or removed from the mold using manual or automated techniques as known by those of ordinary skill in the art.

Post-mold finishing can be done to remove any flash and the resulting cover may be between about 20 and about 50 mils thick on a side and have a Shore D hardness of approximately 20 to 60 using ASTM specification or have a Shore D hardness on the ball of about 30 to about 60 when measured after a two-day waiting period. Subsequently, the ball can be painted and the cover may also be observed to be highly abrasion and cut resistant.

Although in FIG. 10, the mold halves for clarity do not show projections for forming dimples in the cover and the balls are shown without such dimples. The mold halves are formed such that they form dimples in the cover during molding as known by those of ordinary skill in the art.

While it is apparent that the illustrative embodiments of the invention disclosed herein fulfill the objectives stated above, it is appreciated that numerous modifications and other embodiments may be devised by those skilled in the art. For example, the golf ball subassembly can be dipped in latex before the cover is applied. In addition, although the present method is disclosed for use with golf balls it can be used to form other objects of similar materials. Therefore, it will be understood that the appended claims are intended to cover all such modifications and embodiments which would come within the spirit and scope of the present invention.

What is claimed is:

1. A method of making a golf ball, comprising:
   providing a pre-formed golf ball subassembly:
   mixing a first material and a second material in a mixer to form a golf ball cover layer material;
   cooling said mixer;
   wherein said cooling includes using a liquid to cool said mixer;
   cooling said pre-formed golf ball subassembly such that said golf ball subassembly undergoes a volumetric reduction; and
   applying a cover layer of the cooled golf ball cover layer material over said volumetrically reduced golf ball subassembly to form a covered golf ball subassembly.

2. The method of claim 1, wherein said mixing includes mixing said first material and said second material to form a cover layer material including at least 0.05% catalyst.

3. The method of claim 2, wherein said mixing includes mixing said first material and said second material to form a cover layer material including at least 0.1% catalyst.

4. The method of claim 1, wherein said mixing includes mixing said first material and said second material to form a cover layer material having a gel time with a duration of less than about 60 seconds.

5. The method of claim 1, wherein said mixing includes mixing said first material and said second material to form a thermoset polyurethane cover layer material.

6. The method of claim 1, wherein said applying includes casting said cover layer.

7. The method of claim 1, wherein said applying includes injection molding said cover layer.

8. The method of claim 1, further comprising:
   heating said covered golf ball subassembly to a first temperature; and
   holding said covered golf ball subassembly at said first temperature for a first time duration.

9. The method of claim 8, further comprising:
   heating said covered golf ball subassembly to a second temperature; and
   holding said covered golf ball subassembly at said second temperature for a second time duration.

10. A method of making a golf ball, comprising:
    mixing a first material and a second material in a mixer to form a thermoset polyurethane golf ball cover layer material;
    cooling said mixer to maintain the material therein at a temperature of less than about 130° F.;
    cooling said golf ball subassembly such that said golf ball subassembly undergoes a volumetric reduction; and
    applying a cover layer of the cooled golf ball cover layer material over the volumetrically reduced golf ball subassembly to form a covered golf ball subassembly.

11. The method of claim 10, wherein said cooling said mixer includes cooling said mixer using a liquid.

12. The method of claim 10, wherein said cooling said mixer includes cooling said mixer using a liquid.

13. A method of making a golf ball, comprising:
    providing a pre-formed golf ball subassembly;
    cooling said golf ball subassembly such that the golf ball subassembly undergoes a volumetric reduction;
    mixing a first material and a second material in a mixer to form a golf ball cover layer material;
    cooling said mixer;
    applying a cover layer of said golf ball cover layer material over the volumetrically reduced golf ball subassembly to form a covered golf ball subassembly; and
    curing said covered golf ball subassembly to form the golf ball.

14. The method of claim 13, wherein said cooling said mixer includes cooling said mixer with a liquid.

15. The method of claim 13, wherein said curing includes:
    heating said covered golf ball subassembly to a first temperature; and
    holding said covered golf ball subassembly at said first temperature for a first time duration.

16. The method of claim 15, wherein said heating said covered golf ball subassembly to a first temperature includes heating said covered golf ball subassembly to a temperature between about ambient and about 255° F.

17. The method of claim 16, wherein said holding said covered golf ball subassembly at said first temperature includes holding said covered golf ball subassembly at said first temperature for a time duration between about 6 minutes and about 12 minutes.

18. The method of claim 15, wherein said curing further includes:
    cooling said covered golf ball subassembly to a second temperature less than said first temperature; and
    holding said covered golf ball subassembly at said second temperature for a second time duration.

19. The method of claim 18, wherein said holding said covered golf ball subassembly at said second temperature includes holding said covered golf ball subassembly at said second temperature for about 20 minutes.

* * * * *